United States Patent
Hammer

(10) Patent No.: US 7,021,544 B1
(45) Date of Patent: Apr. 4, 2006

(54) CHECKOUT DEVICE INCLUDING SCAN PATTERN-SHIFTING ELEMENT

(75) Inventor: Steven Joel Hammer, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/784,448

(22) Filed: Feb. 23, 2004

(51) Int. Cl.
*G06K 15/00* (2006.01)
*G06K 7/10* (2006.01)

(52) U.S. Cl. .............................. 235/462.13; 235/462.01
(58) Field of Classification Search ............ 235/462.13, 235/462.01

See application file for complete search history.

(56) References Cited

U.S. PATENT DOCUMENTS

| | | | | |
|---|---|---|---|---|
| 4,942,483 A | * | 7/1990 | Kinoshita | .................... 358/484 |
| 6,520,415 B1 | * | 2/2003 | McMaster | .............. 235/462.35 |
| 6,783,072 B1 | * | 8/2004 | Acosta et al. | .......... 235/462.13 |

* cited by examiner

*Primary Examiner*—Karl D. Frech
*Assistant Examiner*—Lisa M. Caputo
(74) *Attorney, Agent, or Firm*—Paul W. Martin; Priest & Goldstein, PLLC

(57) ABSTRACT

A checkout device including an element for shifting a scan pattern to an effective location for scanning. In addition to the optical element, the checkout device includes a bar code reader. The bar code reader includes a housing having an aperture for emitting scanning light beams. The checkout device further includes a security system in the housing and adjacent the aperture for deactivating security labels on scanned items.

9 Claims, 6 Drawing Sheets

CHECKOUT DEVICE INCLUDING SCAN PATTERN-SHIFTING ELEMENT

BACKGROUND OF THE INVENTION

The present invention relates to product checkout devices and more specifically to a checkout device including a scan pattern-shifting element.

Common checkout devices include combinations of barcode scanners and scale assemblies. One example of such a checkout device is the NCR 7875 checkout device.

Another example of a checkout device includes a barcode scanner and an integrated electronic article surveillance (EAS) system and is illustrated in U.S. Pat. No. 5,059,951.

Typical EAS systems must be positioned in a bar code scanner as close as possible to scanned item. In order to accommodate installation of an EAS system, mirrors and possibly other scanner components must be lowered to a less than optimal location in the scanner housing.

Therefore, it would be desirable to produce a checkout device that includes a lens for moving the scan pattern to a more effective location above the checkout device.

SUMMARY OF THE INVENTION

In accordance with the teachings of the present invention, a checkout device including a scan pattern-shifting element is provided.

A checkout device including an element for shifting a scan pattern to an effective location for scanning. In addition to the optical element, the checkout device includes a bar code reader. The bar code reader includes a housing having an aperture for emitting scanning light beams. The checkout device further includes a security system in the housing and adjacent the aperture for deactivating security labels on scanned items.

It is accordingly an object of the present invention to provide a checkout device including a scan pattern-shifting element.

It is another object of the present invention to provide a checkout device including a bar code scanner, scale assembly, and integral electronic article surveillance (EAS) system, without sacrificing performance of the bar code scanner or the EAS system.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
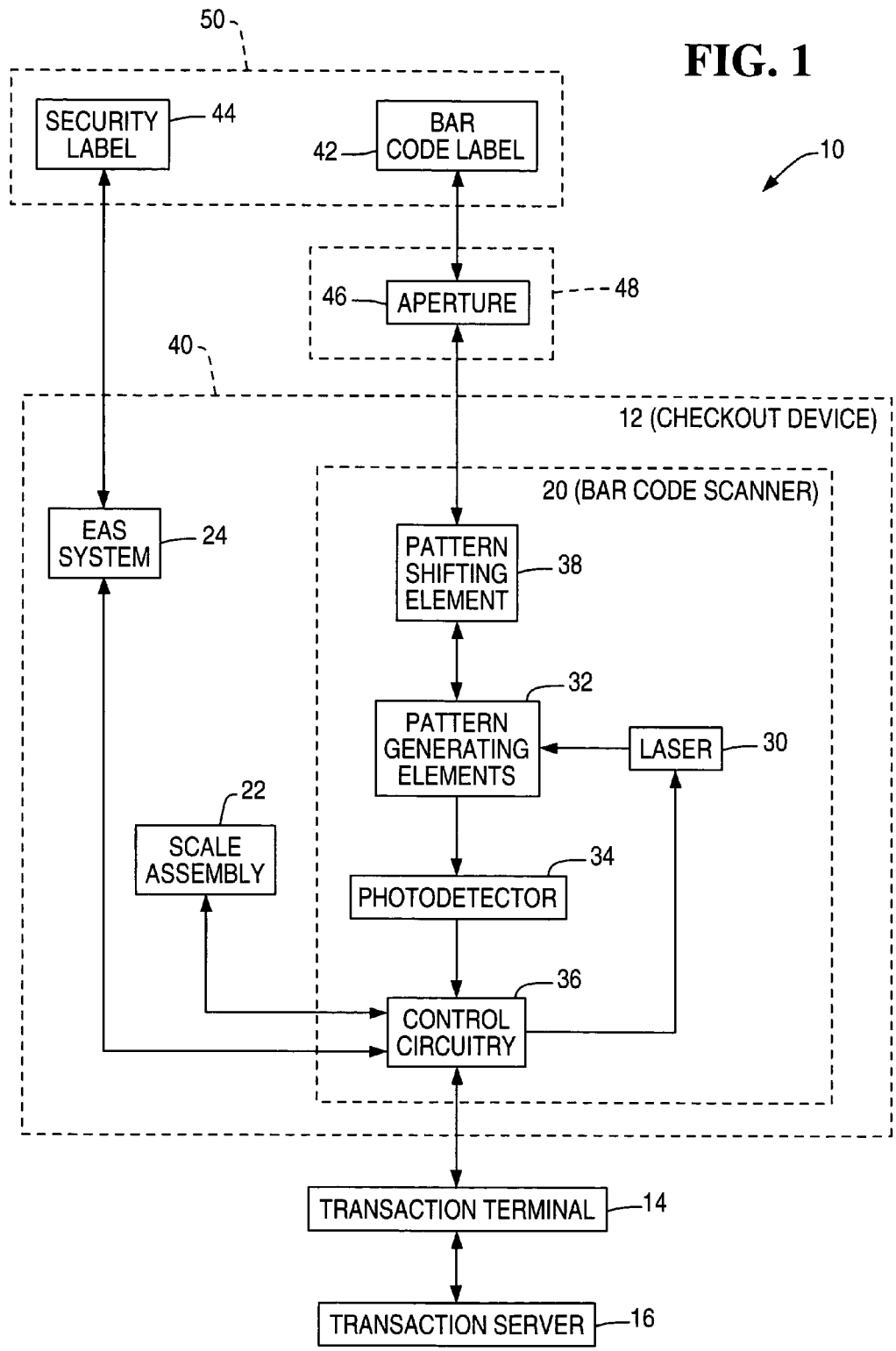
FIG. 1 is a block diagram of an example checkout system.

Referring now to FIG. 1, checkout system 10 primarily includes checkout device 12 and point-of-sale (POS) terminal 14.

Checkout device 12 primarily includes barcode scanner 20, scale assembly 22, and electronic article surveillance (EAS) system 24.

Bar code scanner 20 reads barcode labels 42 on purchased items 50. Barcode scanner 20 may include a single aperture or multi-aperture scanner, such as the NCR model 7876 barcode scanner.

Bar code scanner 20 may include laser 30, pattern-generating elements 32, photodetector 34, and control circuitry 36.

Laser 30 produces a laser beam.

Pattern-generating elements 32 include mirrors for reflecting the laser beam to produce scanning light beams, which emanate through aperture 46. Pattern-generating elements 32 may include a rotating mirrored polygon spinner and a plurality of pattern mirrors oriented at different angles for scattering the laser beam in different directions.

Photodetector 34 converts light reflected from item 50 into electrical signals.

Control circuitry 36 controls operation of bar code reader 20 and also decodes bar code information in the electrical signals.

Pattern-shifting element 38 optically moves the scanning light beams to an effective location, one more optimally suited for reading bar code labels 42. Pattern-shifting element 38 is preferably a glass block which is located above the pattern-generating elements 32.

Figure 2:
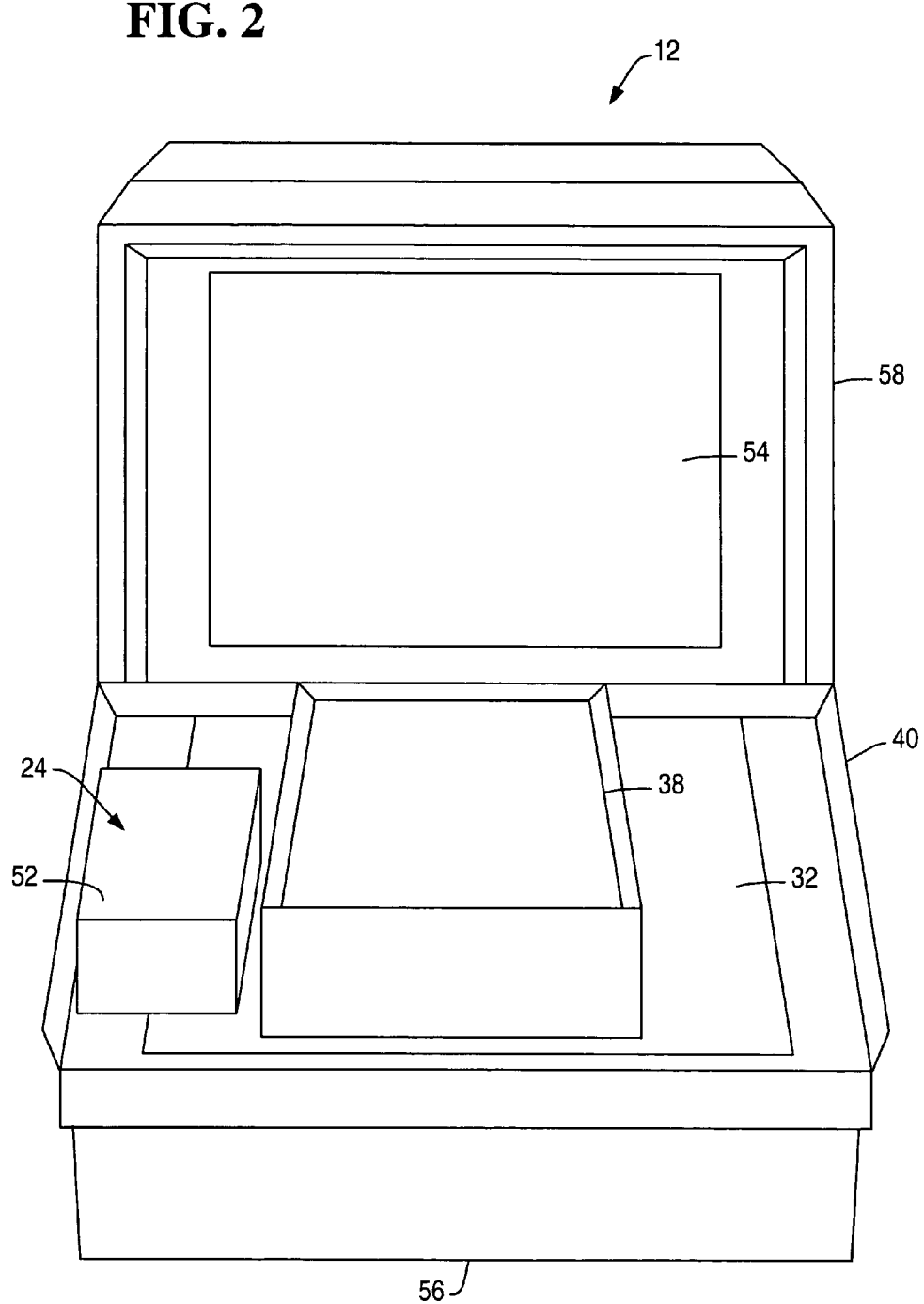
FIG. 2 is a perspective view of the checkout device with the scale weigh plate removed.

One application of pattern-shifting element 38 is to accommodate retrofit installation of EAS system 24 into a checkout device or bar code scanner not originally designed to include EAS system 24 (FIG. 2).

Scale assembly 22 weighs purchased produce items and may include a load cell. Aperture 46 is part of scale weigh plate 48.

EAS system 24 deactivates security labels 44 on purchased items 50 that have them. EAS system 24 is mounted in close proximity to aperture 46 to facilitate reading of bar code label 42 and deactivation of security label 44 during a single scanning motion across checkout device 12. Aperture 46 may be located in a surface of housing 40 or within a scale assembly weigh plate of scale assembly 22.

POS terminal 14 records items for purchase and records payment for the items. POS terminal 14 obtains item identification information from bar code scanner 20 of checkout device 12. POS terminal 14 obtains price information from transaction server 16.

With reference to FIG. 2, an example checkout device 12 is shown. The example checkout device includes horizontal aperture 46 in horizontal portion 56 and vertical aperture 54 in vertical portion 58.

Pattern-shifting element 38 sits on pattern-generating elements 32. In this example, pattern-generating elements 32 were originally designed for use in a checkout device without EAS system 24. In order to accommodate installation of EAS system 24 in an optimal position close to aperture 46, pattern-generating elements 32 were lowered to a less than optimal position in horizontal portion 56 for scanning item 50. The new position is lower than the original position by about the thickness of pattern-shifting element 38. Pattern-shifting element 38 compensates for this mounting location by shifting the scan pattern so that it more closely resembles the original scan pattern.

EAS system 24 may include a magnetic coil 52 packaged to look substantially like a brick. Magnetic coil 52 is mounted close to aperture 46 and adjacent to pattern-shifting element 38.

Scale weigh plate 48 acts as a cover for horizontal portion 56.

Figure 3:
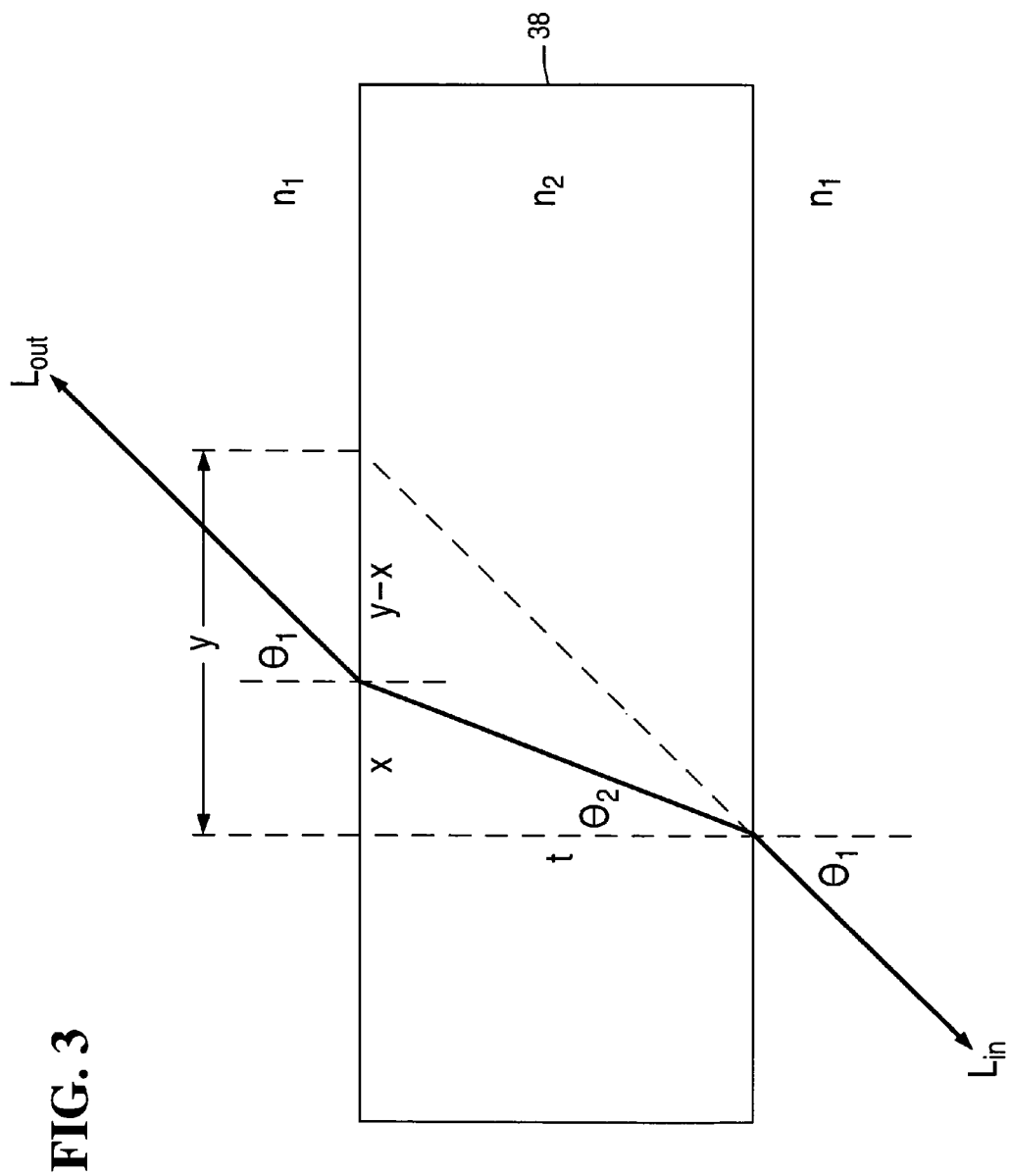
FIG. 3 is a diagrammatic view illustrating operation of the pattern-shifting element.

With reference to FIG. 3, operation of pattern-shifting element 38 is illustrated.

Pattern-shifting element 38 relies on Snell's Law:

$$n_1 \cdot \sin\theta_1 = n_2 \cdot \sin\theta_2,$$

where $n_1$ is the refractive index of air ($n_1=1$), $n_2$ is the refractive index of pattern-shifting element 38, $\theta_1$ is the angle of incidence of a input scanning laser beam $L_{in}$ and the angle of refraction of output scanning laser beam $L_{out}$, and $\theta_2$ is angle of refraction in pattern-shifting element 38.

For example, suppose that pattern-shifting element 38 is made of glass with an index of refraction $n_2$ of 1.5. Further suppose that incident angle $\theta_1$ is 45 degrees, and the thickness t of pattern-shifting element 38 is 1.75 inches.

The refractive angle $\theta_2$ is $$\theta_2 = \sin^{-1}\left(\frac{n_1}{n_2} \cdot \sin\theta_1\right),$$

or 28.13 degrees.

Therefore, the beam shift within pattern-shifting element 38 is $$y-x = t \cdot \tan\theta_1 - t \cdot \tan\theta_2, \text{ or } 0.81 \text{ inches}.$$

Figure 4:
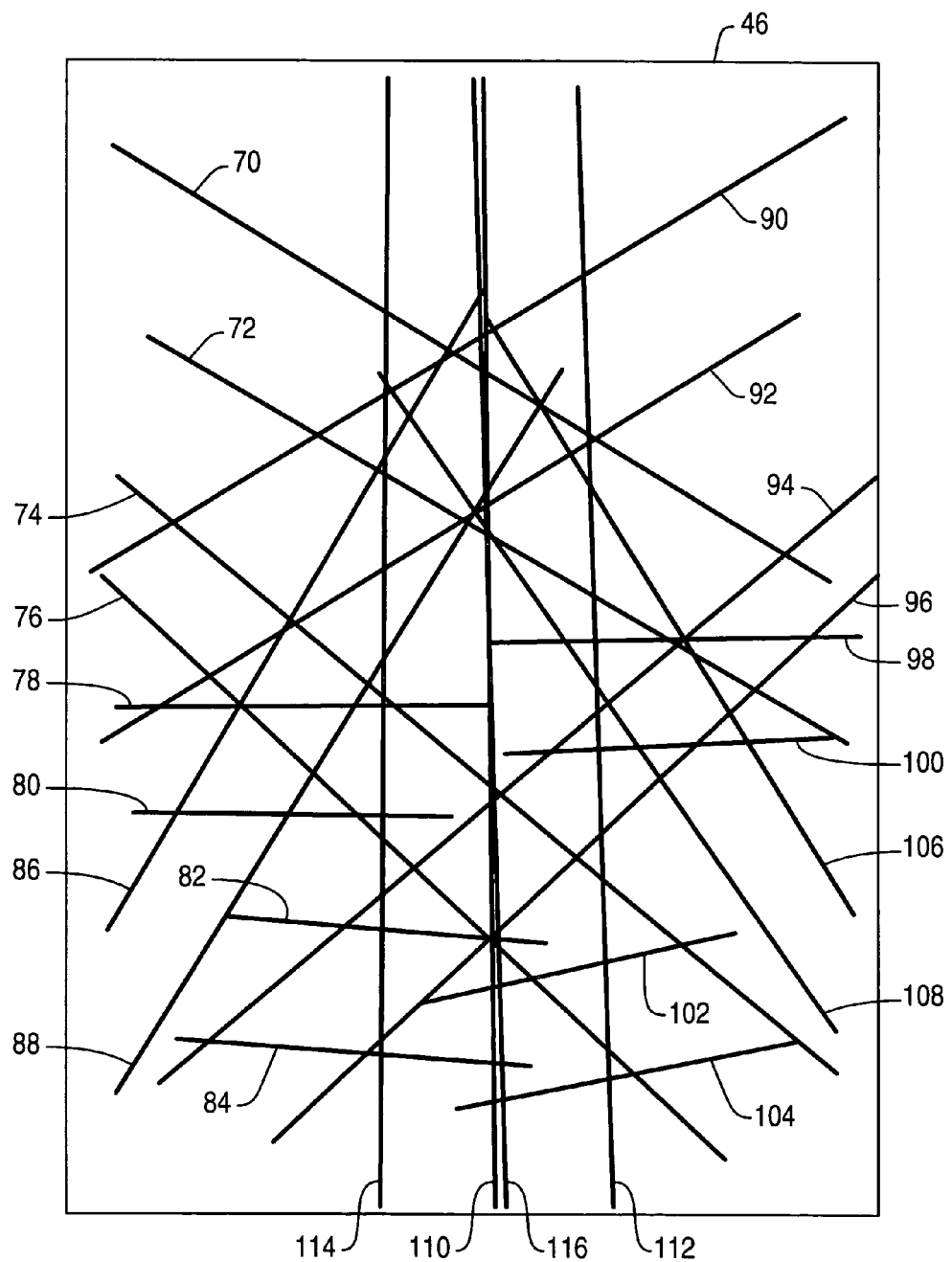
FIG. 4 is a view of a scan pattern from an unmodified scanner.
Figure 5:
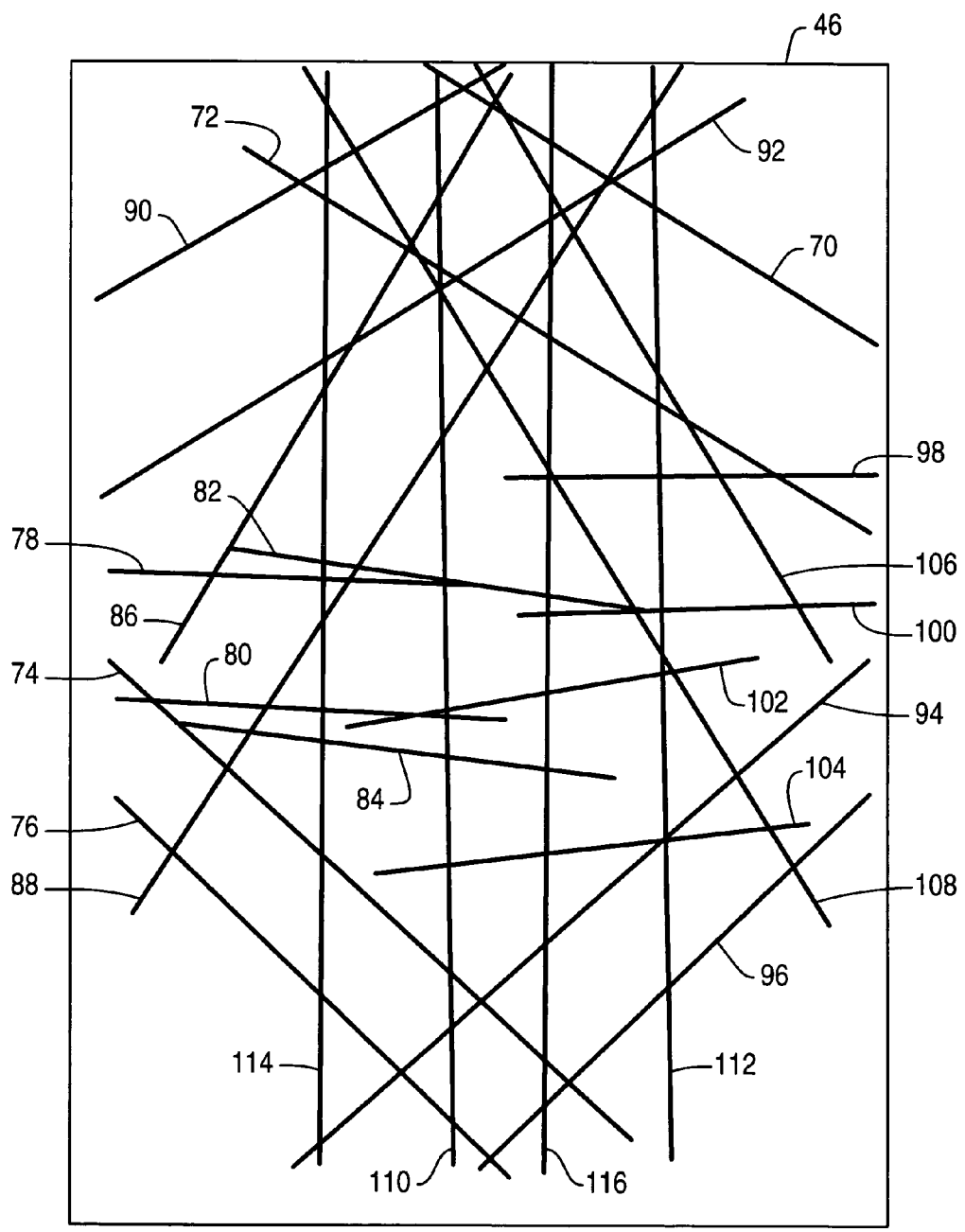
FIG. 5 is a view of a scan pattern from a scanner modified by lowering the pattern-generating elements to accommodate installation of an EAS system.
Figure 6:
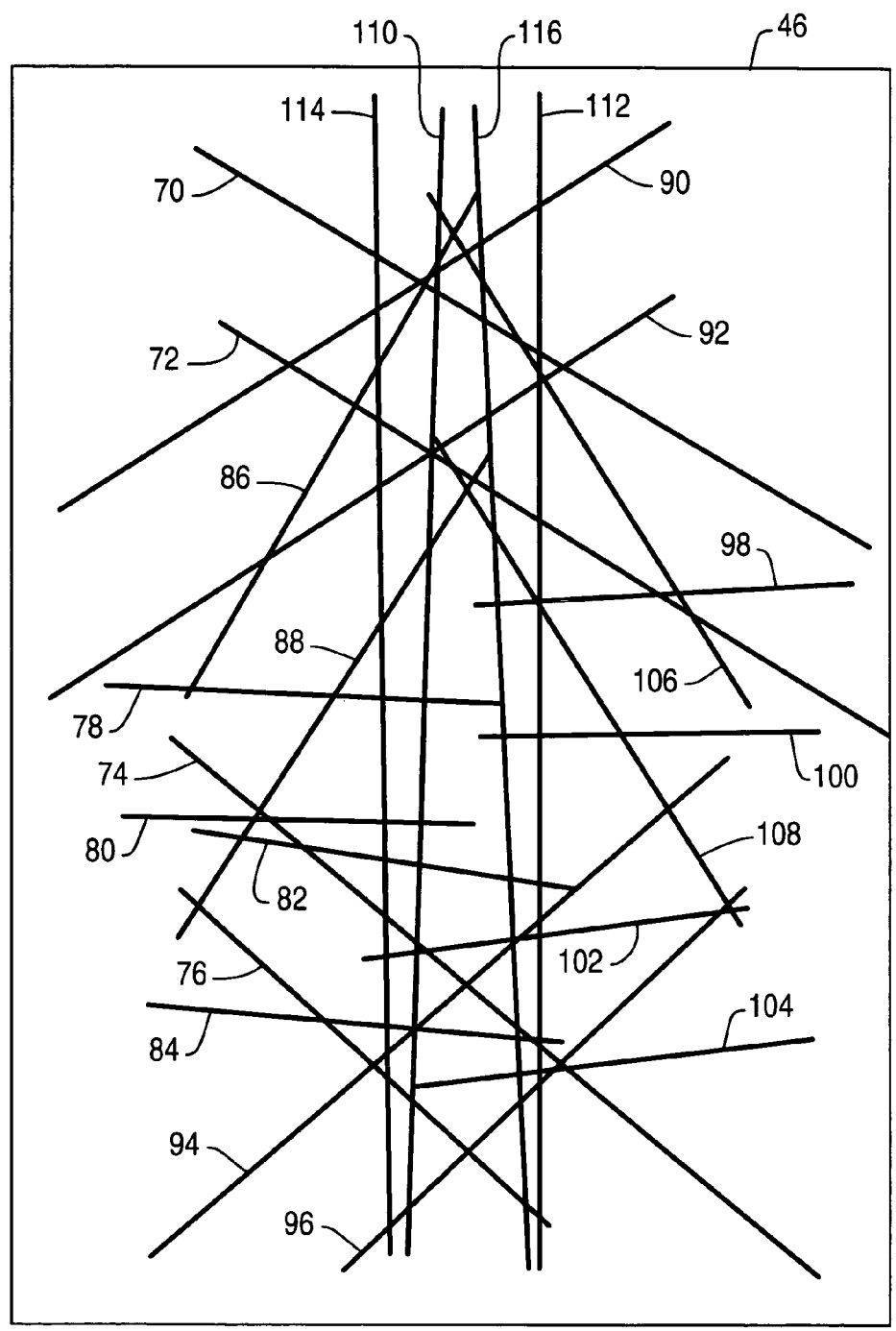
FIG. 6 is a view of a scan pattern from the scanner of FIG. 5 additionally modified to include a pattern-shifting element.

Turning now to FIGS. 4–6, beam patterns are shown for comparison.

With reference to FIG. 4, the scan pattern from the horizontal aperture 46 of an NCR 7876 bar code scanner without modification to accommodate EAS system 24 is shown. Table 1 identifies the side scanned by each of the scan line pairs.

| Scan Line Pair | Sides Scanned |
| --- | --- |
| 70, 72 | Bottom, Intermediate Bottom Customer |
| 74, 76 | Bottom, Checker |
| 78, 80 | Bottom, Checker |
| 82, 84 | Bottom, Checker |
| 86, 88 | Bottom, Checker, Leading |
| 90, 92 | Bottom, Intermediate Bottom Customer |
| 94, 96 | Bottom, Checker |
| 98, 100 | Bottom, Checker |
| 102, 104 | Bottom, Checker |
| 106, 108 | Bottom, Checker, Trailing |
| 110, 112 | Bottom, Trailing |
| 114, 116 | Bottom, Leading |

Table I

With reference to FIG. 5, the scan pattern from the horizontal aperture 46 of an NCR 7876 bar code scanner with modification to accommodate EAS system 24 is shown. Although there is no change in the exiting angles of the individual scan lines, the positions of several lines have changed significantly causing many of these lines to exit so close to the vertical window that they are unusable lines unless the barcode is directly on the deck of the scanner.

With reference to FIG. 6, the scan pattern from the horizontal aperture 46 of an NCR 7876 bar code scanner with modification to accommodate EAS system 24 and with pattern-shifting element 38 is shown. There is no change in the exiting angles of the individual scan lines, and the positions of the scan lines are in the usable portion of the exiting window. There is practically no degradation in scanner performance compared to the scan pattern of the unmodified NCR 7876 bar code scanner (FIG. 4).

Although the invention has been described with particular reference to certain preferred embodiments thereof, variations and modifications of the present invention can be effected within the spirit and scope of the following claims.

The invention claimed is:

1. A checkout device comprising:
   a bar code reader including a housing having an aperture for emitting scanning light beams;
   a security system in the housing and adjacent the aperture for deactivating security labels on scanned items; and
   an optical element in the bar code reader for shifting the scanning light beams to an effective location above the aperture, the optical element being constructed and disposed so as to refract the scanning light beams reflected from pattern mirrors in the bar code reader such that the scanning light beams trace out a scan pattern displaced from the scan pattern that would be traced out by the scanning light beams in the absence of the optical element.

2. The device of claim 1, wherein the optical element comprises a glass block.

3. A checkout device comprising:
   a bar code reader including a plurality of pattern mirrors for producing a scan pattern of scanning light beams and a housing having an aperture for emitting the scanning light beams;
   a security system above the pattern mirrors and adjacent the aperture for deactivating security labels on scanned items; and
   an optical element in the path of the scanning light beams for shifting the scan pattern to an effective location above the aperture, the optical element being constructed and disposed so as to refract the scanning light beams reflected from the pattern mirrors in the bar code reader such that the scanning light beams trace out a scan pattern displaced from the scan pattern that would be traced out by the scanning light beams in the absence of the optical element.

4. The device of claim 3, wherein the optical element comprises a glass block.

5. A checkout device comprising:
   a bar code reader including a plurality of pattern mirrors for producing a scan pattern of scanning light beams and a housing having an aperture for emitting the scanning light beams;
   a security system above the pattern mirrors and adjacent the aperture for deactivating security labels on scanned items;
   wherein the pattern mirrors are designed to be placed in an original position located at a first distance away from the aperture and produce a first pattern, but have instead been relocated to be at a second distance away from the aperture in order to accommodate installation of the security system in the housing the relocation of the pattern mirrors causing them to produce a second pattern displaced from the scan pattern that would be produced if the pattern mirrors were deployed in their original position; and an optical element in the path of the scanning light beams for shifting the second pattern to produce a third pattern, the optical element being constructed and disposed so as to refract the scanning light beams reflected from the pattern mirrors in the bar code reader such that the scanning light beams trace out a scan pattern displaced from the scan pattern that would be traced out by the scanning light beams in the absence of the optical element, the displacement being such that the scan pattern that is traced out is in substantially the same position as a scan pattern that would be produced with the pattern mirrors in their original position and in the absence of the optical element;

wherein the third pattern is substantially as effective as the first pattern.

6. The device of claim 5, wherein the optical element comprises a glass block.

7. A checkout device comprising:

a housing;

a bar code reader in the housing including pattern mirrors for producing a scan pattern of scanning light beams;

a weigh plate above the housing, including an aperture for emitting the scanning light beams;

an optical element in the path of the scanning light beams for shifting the scanning light beams, the optical element being constructed and disposed to refract the scanning light beams reflected from the pattern mirrors in the bar code reader such that the scanning light beams trace out a scan pattern displaced from the scan pattern that would be traced out by the scanning light beams in the absence of the optical element; and a security system beneath the weigh plate and adjacent the optical element in a location for facilitating scanning of items and deactivation of security labels on the items during a single swipe of the items over the weigh plate.

8. The device of claim 7, wherein the optical element comprises a glass block.

9. A transaction method comprising the steps of:

producing a laser beam;

directing the laser beam at a plurality of pattern mirrors for generating scanning light beams;

refracting the scanning light beams such that the scanning light beams trace out a scan pattern displaced from the scan pattern that would be traced out by the scanning light beams in the absence of the refraction, refraction being performed so as to shift the scanning light beams to an effective location above the aperture for reading a bar code label on an item;

shifting light reflected from the item as the item passes over the aperture during a scanning motion;

collecting the light reflected from the item by the pattern mirrors;

decoding the bar code label from the light reflected from the item; and deactivating a security label on the item during the scanning motion.

* * * * *